Figure 1:
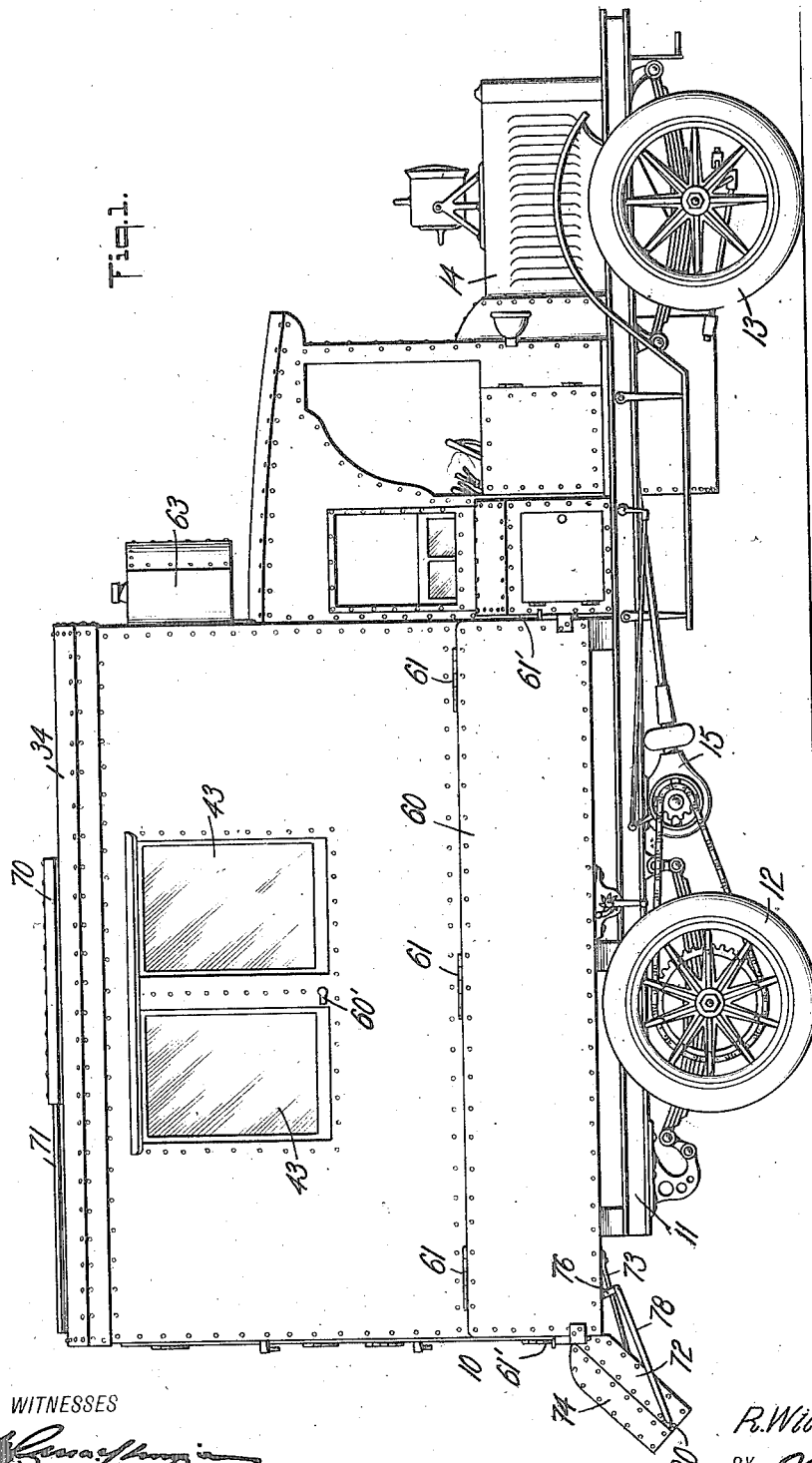

R. WILLIAMS.
AMBULANCE.
APPLICATION FILED FEB. 8, 1916.

1,208,433.

Patented Dec. 12, 1916.
6 SHEETS—SHEET 5.

WITNESSES

INVENTOR
R. Williams
BY
ATTORNEYS

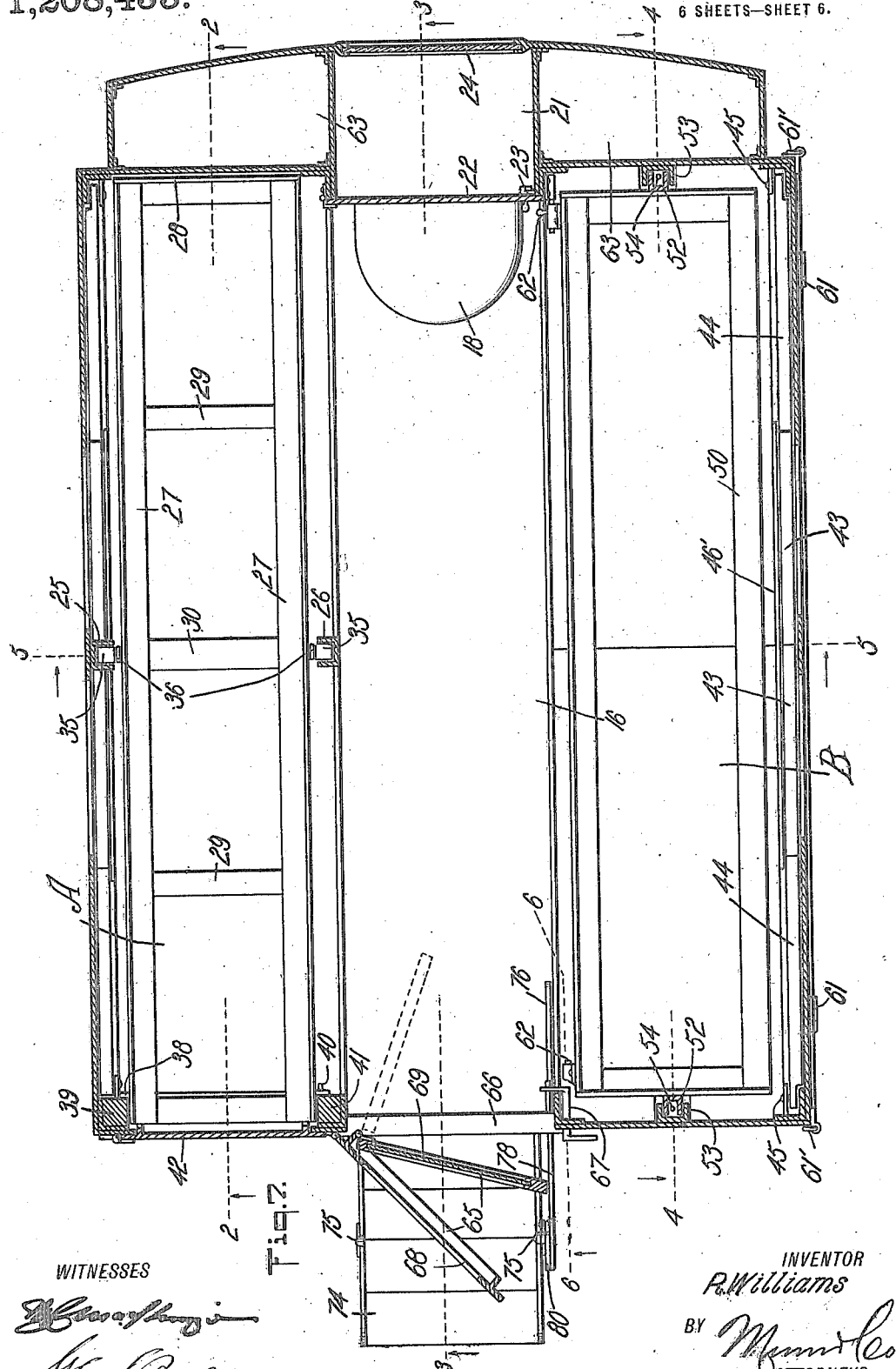

UNITED STATES PATENT OFFICE.

ROBERT WILLIAMS, OF NEW YORK, N. Y.

AMBULANCE.

1,208,433.

Specification of Letters Patent.  Patented Dec. 12, 1916.

Application filed February 8, 1916.  Serial No. 76,937.

*To all whom it may concern:*

Be it known that I, ROBERT WILLIAMS, a citizen of the United States, and a resident of the city of New York, borough of Manhattan, in the county and State of New York, have invented a new and Improved Ambulance, of which the following is a full, clear, and exact description.

This invention relates to ambulances and especially to those designed for army or other field use where a number of patients may be received and transported at the same time.

Among the objects of the invention is to provide an ambulance having facilities for surgical attendance and assistance while the vehicle is in the field or on the way to the hospital.

Another object of the invention is to provide an automobile structure with means within the body of the vehicle to accommodate a considerable number of men in sitting position and a less number in reclining position, means being provided, however, to utilize to the best advantage all the available space so as to accommodate the largest possible number of men seriously wounded, the patients being carried in such position so that the surgeon accompanying the ambulance may have the best possible advantage in operating while the machine is occupied.

A further object of the invention is to improve the interior construction of the body of an ambulance so as to adapt it for the accommodation of not only the patients and the operations of the surgeon, as above intimated, but as storage means for the ambulance's apparatus or other articles which may be desired to be transported.

A still further object of the invention is to improve the facilities for receiving or admitting patients to the body of the ambulance.

Another object of the invention is to provide lighting and ventilating facilities.

A further object of the invention is to meet the requirements for thorough cleansing or sanitation of the construction.

A still further object of the invention is to provide an improved type of folding or collapsible step for the use of the surgeon, the same being especially designed for manipulation both to open and close by a single lever accessible from within the body of the vehicle.

With the foregoing and other objects in view, the invention consists in the arrangement and combination of parts hereinafter described and claimed, and while the invention is not restricted to the exact details of construction disclosed herein, still for the purpose of illustrating a practical embodiment thereof reference is had to the accompanying drawings, in which like reference characters designate the same parts in the several views, and in which—

Figure 2:
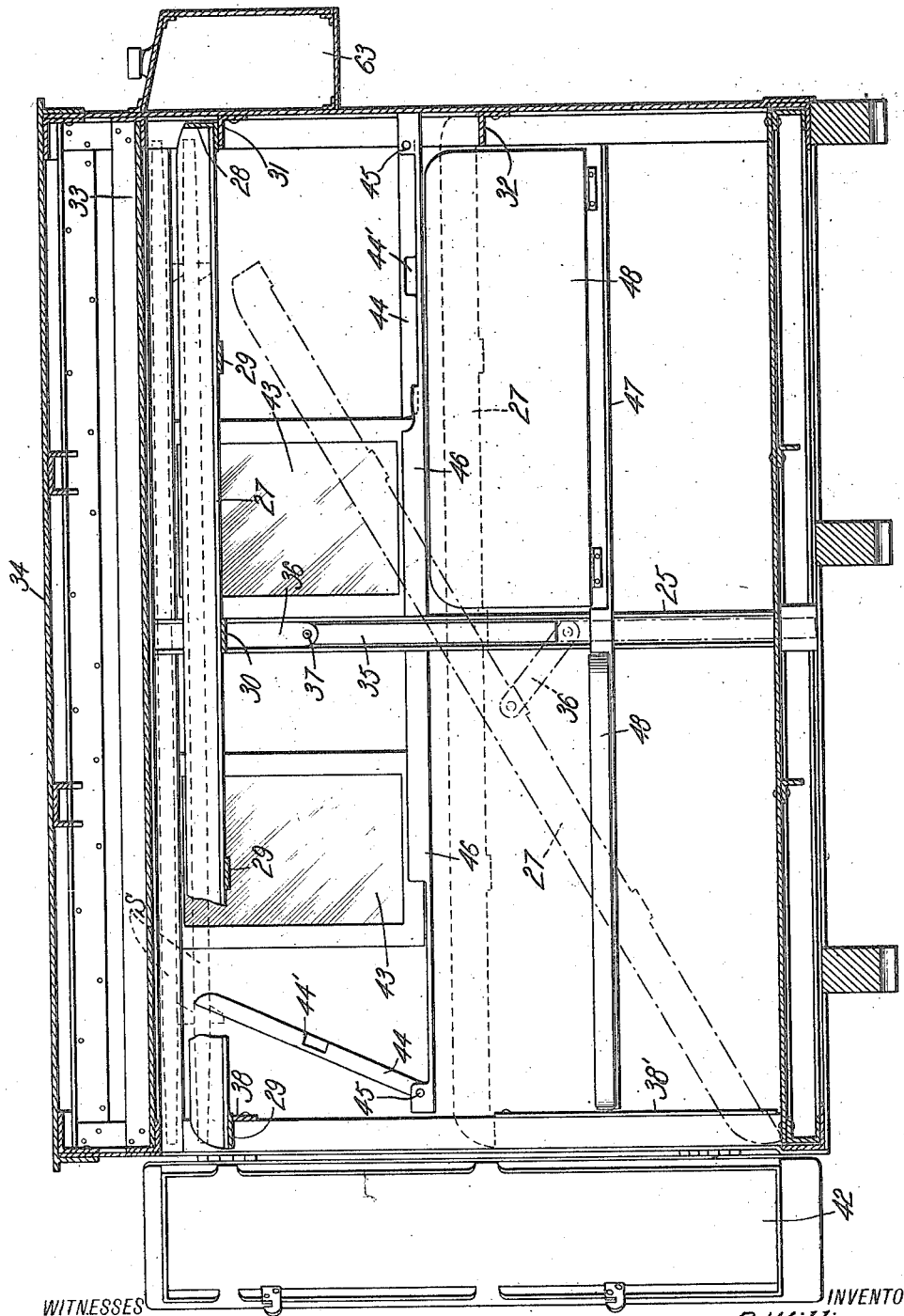
Figure 3:
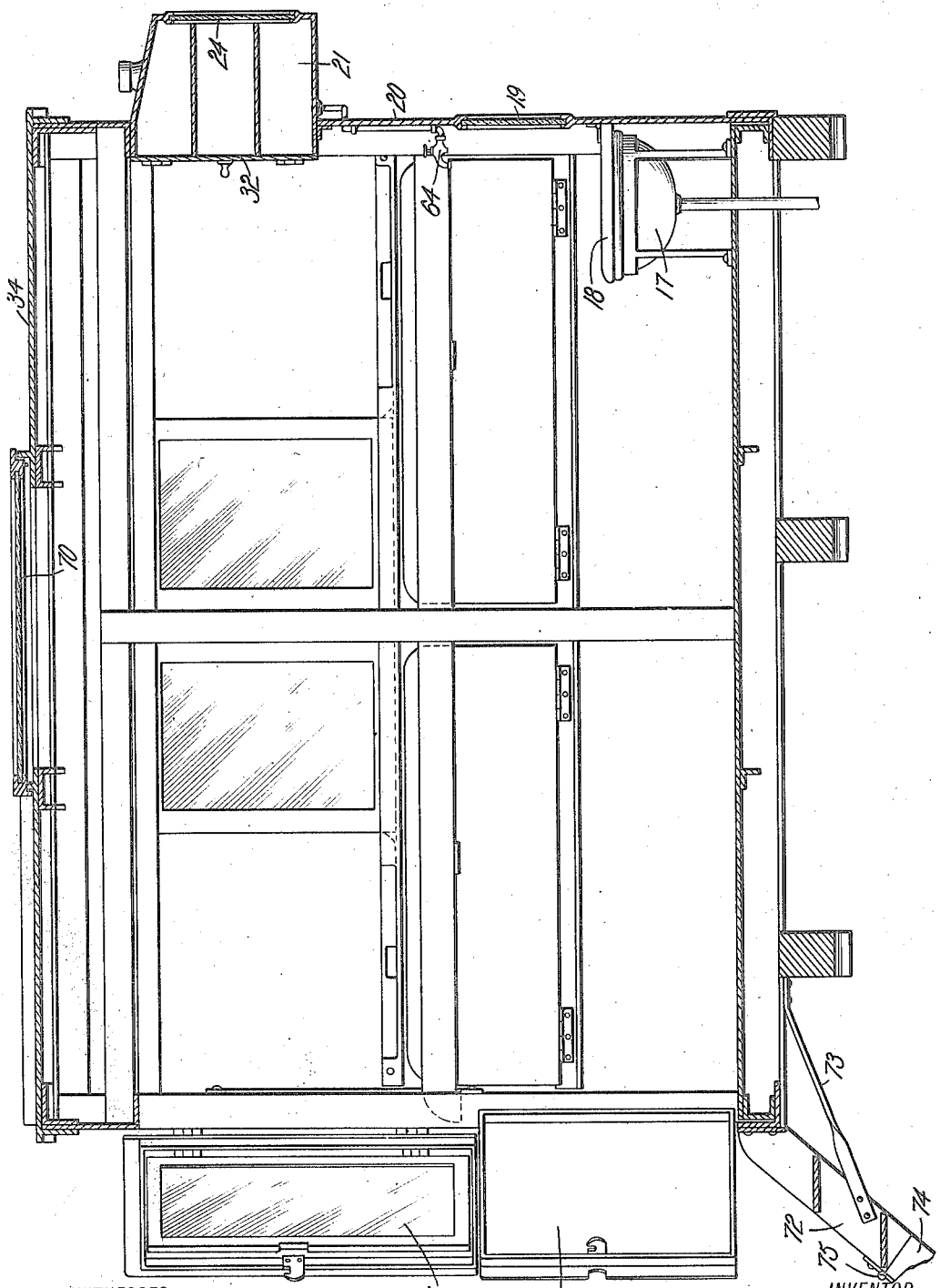
Figure 4:
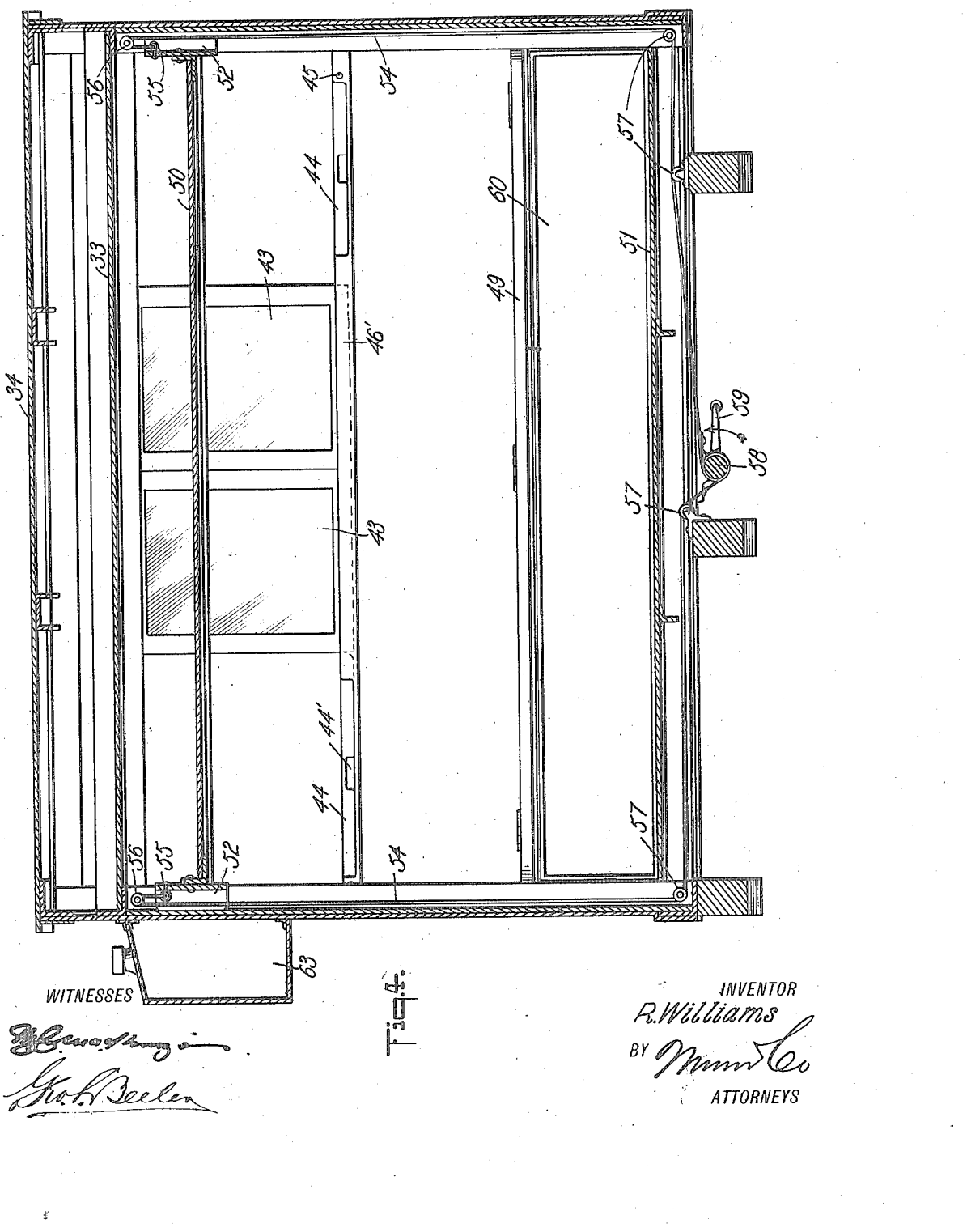
Figure 5:
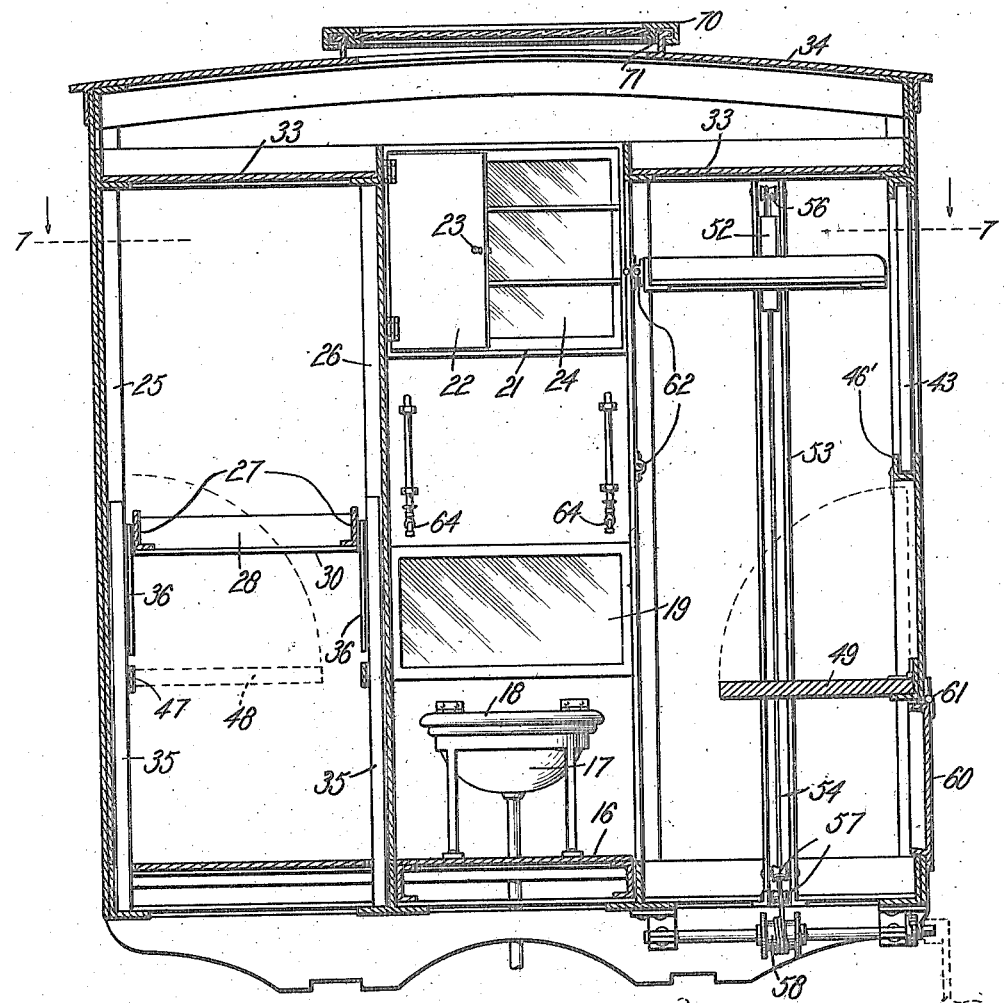
Figure 6:
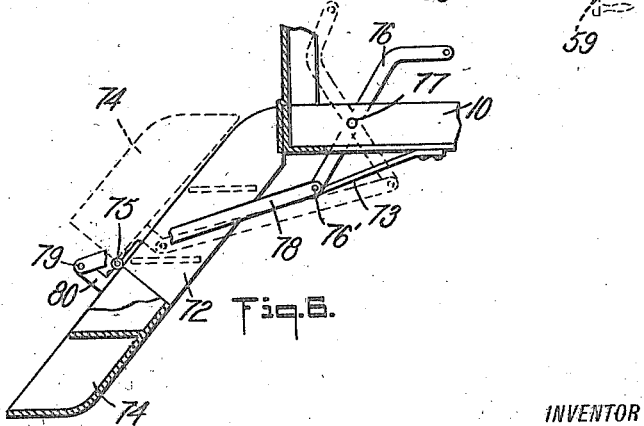

Figure 1 is a side elevation of a preferred embodiment of the invention; Fig. 2 is a vertical longitudinal section through the left side of the body as indicated on the line 2—2 of Figure 7; Fig. 3 is a vertical central sectional view on the line 3—3 of Fig. 7; Fig. 4 is a vertical longitudinal sectional view of the right side of the body on the line 4—4 of Fig. 7; Fig. 5 is a transverse vertical section on the line 5—5 of Fig. 7; Fig. 6 is a vertical sectional detail of the rear portion of the frame of the body indicating the foldable step mainly in side elevation; and Fig. 7 is a horizontal sectional view on the line 7—7 of Fig. 5.

Referring now more particularly to the drawings I show a body 10 mounted upon a chassis 11 supported upon traction wheels 12 and steering wheels 13 having an engine 14 and transmission mechanism 15 of any suitable or approved construction.

The means for supporting and propelling or traversing the ambulance body may be varied almost indefinitely without affecting the scope of the invention, such devices *per se* constituting no part of this invention.

The body 10 is designed to accommodate a surgeon in and along a central aisle or passageway 16 at the front end of which is arranged a washbowl 17 having a hinged cover 18 constituting or affording a seat for the surgeon. Directly above the seat is provided a window 19 for light or ventilation, and above this window is supported in the front end 20 of the body a cabinet 21 for instruments, remedies or the like for the use of the surgeon, he having access thereto through a door 22 opening inwardly but adapted to be held closed by a catch 23. The front wall of the cabinet 21 is provided with a window 24.

The body is built with a view of meeting the demand for an ambulance having capacity for the conveyance of a large number of passengers or patients in either a sitting or reclining position. Therefore I provide accommodation for such passengers or invalids on each side of the central aisle 16. Accordingly at A I provide a compartment on the left side of the body and at B a compartment on the right side of the body. Either of these compartments in a moderate sized vehicle of this nature may accommodate conveniently six passengers or patients sitting or two reclining, one above the other. Referring especially to compartment A, see Figs. 2 and 7, I provide a pair of vertical channel members 25 and 26 arranged in the same vertical transverse plane about the middle of the body. The open sides of the channels are directed toward each other. Between the channels is arranged and is movably supported a frame or cradle 27 comprising side members of angle construction having their front ends connected by a transverse bar 28 also of angle construction. The bars 27 are also connected intermediate their ends by flat transverse bars 29 and 30. A bar 29 also is arranged to connect the rear ends of the bars 27. At the front end of the compartment A are arranged two transverse rigid angle members 31 and 32, the one above the other. The front transverse angle 28 is adapted to be supported directly upon one or the other of these bars 31 and 32, the upper one being closely beneath the shelf 33 near the top 34 of the body. At 35 is indicated a pair of slides fitted movably in the channels 25 and 26 and serving as supporting legs for the cradle 27 when in loading position shown in dotted and dash lines in Fig. 2. The middle portion of the cradle at the bar 30 is connected by links 36 to the upper ends of the slides, said links being pivotally connected to the slides at 37. While the slides 35 are retained within the channels the links 36 lie in planes between the channels and hence are free to swing with the cradle so far as the channels and the slides are concerned. The normal idle position of the cradle is indicated in full lines in Fig. 2. The front end thereof is supported upon the bar 31 and the rear end thereof is supported upon a movable bar 38 pivoted at one end to a corner post 39 and adapted to coöperate with a catch 40 on the post 41 at the inner rear corner of the compartment A. When the cradle is thus supported, the slides 35 hang freely within the channels and upon the pivots 37. To bring the cradle into use the bar 38 is lowered, setting free the rear end of the cradle and allowing it to tilt downwardly and the cradle as a whole to tilt rearwardly so that while the cradle moves downwardly with the slides along the channels the front end of the cradle rides over and free from the horizontal angle bar 31. The arrangement of the slides and links then permits the tilting and rearward movement of the cradle so that the rear end thereof reaches to the bottom of a door 42 adapted to open and close the rear end of the compartment. Any suitable form of stretcher may be received and employed to manipulate the patient, the stretchers being indicated in stored position in dotted lines at S in Fig. 2 between the cradle and the shelf. When the cradle is lowered the surgeon may deliver these stretchers from their storage place through either of the rear doors of the body, and while the patient is being received thereon and conveyed to the ambulance the cradle will be lowered as indicated in broken lines in Fig. 2, so that the driver of the vehicle with one attendant may lift and deliver the patient through the door 42 and slide the stretcher along the angle bars 27, an easy expedient because of the comparatively low rear end of the cradle at such time.

While the stretcher is being shoved up and forwardly, the cradle remains in its inclined position, but when the patient is received thereon, any operator, either the surgeon or one of the other attendants, may easily tilt the cradle so as to bring it into the dotted line position of Fig. 2 with its front end resting upon the lower horizontal bar 32 and with the slides 35 resting at their lower ends upon the bottoms of the channels. The rear end of the cradle may then be supported rigidly by a bar 38' similar to the bar 38 above described. The patient thus received into the ambulance will be in position for easy attention by the surgeon. A pair of movable windows 43 located in the side wall of the compartment provide both light and air. These windows, under ordinary conditions, may be locked by bars 44 pivoted at 45, but for maximum light and ventilation they may be slid toward the ends of the body along supporting bars 46. Each of the bars is notched at 44' to provide easy manipulation. The space beneath the cradle in its occupied position may be filled with another stretcher and patient who likewise may be attended by the surgeon while in his place along the passageway 16.

At 47 is indicated a bar to which are hinged a pair of seats 48 which may be folded up against the wall and held in place by any suitable means and especially by the cradle when in its loaded position. When, however, the compartment is to be occupied by passengers in sitting position, the cradle will be left in its elevated position, as shown in full lines in Fig. 2, and the seats may be lowered as indicated at the left end of Fig. 2.

On the right side of the body in compartment B I provide accommodation for other patients either in sitting position upon a hinged seat 49 or in reclining position upon a movable platform 50 and upon the floor 51 beneath said platform. Without unnecessarily restricting the scope of the invention as to any particular means for accommodating patients in reclining position I show the platform 50 in the nature of an elevator having vertical shoes 52 rigidly secured to the ends of the platform perpendicular thereto and guided in vertical channels 53 arranged in the same vertical longitudinal plane at the middle portion of the compartment B. A pair of cables 54 are connected at 55 to the upper ends of these shoes and extend thence upwardly over direction pulleys 56 and thence downwardly and toward each other over other direction pulleys 57 to a windlass 58 having an operating handle 59 or its equivalent to control the movements of the platform 50. The normal position of the platform 50 is indicated in Fig. 4 and as being in substantially the same horizontal plane as the above described cradle when in idle position and hence there is provided another storage place for stretchers between the platform and shelf 33 spaced just below the roof 34, the same as on the other side. As shown best in Fig. 1, a door 60 is provided along the full length of the body at the lower portion of the right side and adapted to swing outwardly and upwardly upon hinges 61 leaving an opening of ample proportions to receive a stretcher with a patient thereon directly over the wheel 12 where he may be delivered upon the platform after the same has been lowered to the floor 51. The door may be held up temporarily by any suitable means such as a turnbutton 60'. Bolts 61' are provided to lock the door closed. After the patient is thus received upon the platform from either of the operators by manipulation of the windlass may hoist the platform and patient into the plane corresponding to the plane of the loaded cradle 27 above described or in position to be treated conveniently by the surgeon. In either the uppermost or mid position of the platform 50 it may be locked positively by keepers 62 or their equivalent under the control of the surgeon. The shoes 52 being of sufficient height, all tendency of the platform to tilt will be practically eliminated. After the patient has been received upon the platform and elevated to the operating position, ample space is left to receive another stretcher and patient upon the floor 51, who, in turn, may be treated by the surgeon.

The body is made up practically all of sanitary material and in such a manner as to provide for the removal of all portions, such as floors or other panels, which are subject to contamination by blood or the like, so that they may be thoroughly cleansed and sterilized. The compartment B as well as the compartment A is provided with sliding windows 43 adapted to be locked shut by bars 44 pivoted at 45, the windows being guided and supported along a rail 46'.

On opposite sides of the cabinet 21 are arranged neatly proportioned and symmetrically formed reservoirs 63 for water, or one may be used for water and the other for carrying fuel or other supplies for the automobile. If water is conveyed in these reservoirs one of them may be heated by the exhaust from the engine or otherwise in a well known manner, and the water from these reservoirs may be delivered to the basin 17 by means of faucets 64 arranged within the body but out of the way of the surgeon when he is seated upon the seat 16, a suitable tube or other flexible connection (not shown) being depended upon to convey the water into the basin.

Access to the passageway 16 is governed by upper and lower doors 65 and 66 hinged to or adjacent the post 41, and either or both of which may be locked closed by hasps 67. The upper door includes a frame 68 and a window portion 69 hinged to the frame and adapted to swing inwardly independently of the frame which may be swung outwardly. This portion 69 provides free ventilation. It will thus be seen that I provide ample light and ventilation from both ends and both sides of the body and also the roof is provided with a skylight 70 slidable along guideways 71 to provide ventilation at the top. The skylight as well as other movable openings for the body is so constructed as to exclude rain or snow.

The surgeon in charge of the ambulance may have complete control of the steps leading to the central portion thereof and over which the surgeon may pass up or down as well as the patients partly disabled who may occupy the seats provided in the compartments A and B. The steps shown comprise a rigid portion 72 braced at 73 to the bottom of the body and also a movable section 74 hinged at 75 to swing upwardly and forwardly over the stationary section. The means for manipulating the movable section of the steps is peculiar, the same comprising a lever 76 pivoted at 77 within the passageway 16 at one side thereof. The lever 76 is of the first class and has the lower end connected by a bar or link 78 connected at the outer end at 79 to a rigid bell crank 80 secured to the movable section 74, as shown in Fig. 6. Even though the pivot point 79 swings through an arc of substantially 180 degrees, when the section 74 is moved from open to closed position, yet the surgeon, by manipulating the lever 76, will always be able to shift the movable section of the steps to the opposite position directly. In other words, when in extended position, as shown in full lines in Fig. 6, the axis of the bar 78 lies above the pivot 75 and hence the forward draft upon the arm serves to lift up upon the bell crank 80 and movable section of the steps. When the lever has thus been operated to lift the step, the pivot point 76' at the front end of the bar 78 will have moved downwardly with respect to the original axis of the bar 78 sufficiently to bring the axis of the bar still above the axis 75, so that when the reverse movement of the lever is to take place the rearward thrust upon the bar 78 will lift the movable section 74 from its folded position and allow it to swing downwardly. Any suitable means may be provided auxiliary to the connections above described for locking the lever 76 in either position.

I claim:—

1. In a field ambulance, the combination of a body having pairs of upright guideways, slides movable up and down along said guideways, stretcher cradles each comprising a rigid frame, a pair of links pivotally connected at their upper ends to the cradle frame and at their lower ends to the upper ends of a pair of said slides, means to support the ends of the cradle when swung upwardly into horizontal position around said pivotal connections, and supporting means for the lower ends of the slides whereby said slides constitute supporting legs for the cradle.

2. In an ambulance, the combination of a body having pairs of corner posts, a pair of channel guides midway between the pairs of posts, a pair of supporting slides in said guideways, a stretcher cradle, a pair of links pivotally connecting the middle portion of the cradle to the upper ends of said slides permitting one end of the cradle to tilt so as to lie adjacent the end of the body, and means coöperating with said corner posts to support the ends of the cradle when swung into horizontal position.

ROBERT WILLIAMS.

Witnesses:
 GEO. L. BEELER,
 PHILIP D. ROLLHAUS.